United States Patent [19]

Harvey

[11] Patent Number: 5,318,188

[45] Date of Patent: Jun. 7, 1994

[54] MATERIAL HANDLING SYSTEM

[75] Inventor: Robert J. Harvey, Stanton under Bardon, England

[73] Assignee: Caterpillar Inc., Peoria, Ill.

[21] Appl. No.: 841,334

[22] Filed: Feb. 25, 1992

[30] Foreign Application Priority Data

Dec. 5, 1991 [EP] European Pat. Off. ......... 91311331.2

[51] Int. Cl.5 .............................................. A47F 5/08
[52] U.S. Cl. .................................... 211/151; 211/162; 414/277
[58] Field of Search ................ 414/276, 277; 211/162, 211/151; 292/183, 189

[56] References Cited

U.S. PATENT DOCUMENTS

| 1,739,509 | 12/1929 | Goodrich | 211/162 X |
| 2,769,559 | 11/1956 | Johnson | 211/151 |
| 3,465,897 | 9/1969 | Schumann et al. | 211/151 |
| 4,341,313 | 7/1982 | Dorig | 211/151 |

FOREIGN PATENT DOCUMENTS

| 52106 | 11/1966 | Fed. Rep. of Germany . |
| 2932241A1 | 2/1981 | Fed. Rep. of Germany . |
| 3309190A1 | 9/1984 | Fed. Rep. of Germany . |
| 60-171902A | 9/1985 | Japan . |
| 63-218402A | 9/1988 | Japan . |
| 399125 | 9/1933 | United Kingdom ................. 292/189 |

Primary Examiner—Blair M. Johnson
Attorney, Agent, or Firm—Alan J. Hickman

[57] ABSTRACT

A material handling system incorporates one or more interface trolley systems comprising a plurality of trolleys disposed adjacent one another and slidable on guides disposed parallel to one another either individually or in groups. The material handling system comprises one or more racks, each of which includes a series of columns of storage locations. The or each trolley system is disposed at the base of one or more of the columns, and the or each rack includes a lift mechanism located and arranged to move materials and articles into and out of the storage locations and deliver them to or retrieve them from individual or plural trolleys of the or one of the trolley systems under operator control or automatically.

7 Claims, 6 Drawing Sheets

MATERIAL HANDLING SYSTEM

TECHNICAL FIELD

The present invention relates to material handling systems and, more particularly, to an interface trolley system for use therewith in combination with an automated storage retrieval system (ASRS) incorporated therein.

BACKGROUND ART

Sophisticated material handling systems have been developed in recent years and are now being put to use in so-called flexible manufacturing systems. Such a material handling system is often designed around a lift which is able to move longitudinally in an aisle between a pair of racks forming storage areas comprising a series of columns divided into storage locations, the lift having forks or the like which are extendable on either side in order to pick up materials which are stowed in the storage bays on pallets. The lift is controlled automatically and is arranged to retrieve articles from the storage bay and insert articles into the storage bays on command. This is the basis of an ASRS. One or more input and output areas are provided.

Adaptation of such a material handling system to a flexible manufacturing system involves the requirement for plural manufacturing or assembly stations to be provided, preferably immediately adjacent the storage racks, at the base of the columns of the racks. However, it is not sufficient merely for the lift to deposit material or articles at the base of the storage rack, since the manufacturing or assembly process will usually require the operator to work around the article and may involve the use of an external crane, for example, which will need to gain access to the assembly or manufacturing area. Thus, such an area needs to be provided externally, to one side of the storage rack and some means is therefore required to move materials or articles from the lowermost position in the columns of the storage rack to an adjacent area.

Whilst this has been achieved with the use of mechanically driven conveyors, the provision of such equipment dramatically increases the costs of the system, due to the need to provide such equipment at the base of each column of the storage rack, if the material handling system is to be fully integrated into a flexible manufacturing system. Furthermore, such extendable forks or conveyors are also bulky and, depending upon the materials or articles being handled, may be unnecessarily so, particularly when dealing with relatively small but massive or heavy articles.

A further problem is that of providing for delivery of different sized loads, the existing systems being inflexible in this regard.

The present invention sets out to overcome these problems in order to provide an effective solution to the problem of delivering materials or articles from a rack to a manufacturing station.

DISCLOSURE OF THE INVENTION

According to a first aspect of the present invention therefore an interface trolley system for a material handling system comprises a plurality of trolleys disposed adjacent one another and slidable on guides disposed parallel to one another, either individually or in groups.

The trolleys may be moved by hand and may be connectable to one another to facilitate movement of adjacent trolleys in unison the trolleys preferably being latched in a retracted position within the base of storage columns in which they are located.

The trolleys may incorporate a pair of front wheels disposed on the ground and a pair of rear rollers disposed in guide rails and spaced above ground level to support the rear of the trolley. Preferably, the trolleys are arranged in groups of four, being spaced apart from one another sideways by a distance chosen so that standard size pallets of one, two or four unit width may variously be disposed on the trolleys securely.

Each of the rails may incorporate polyurethane wear strips for reducing wheel and rail wear and the front and rear wheels of the trolley may also be formed of polyurethane.

The invention includes a material handling system incorporating an interface trolley system as defined above, the material handling system comprising one or more racks each comprising a series of columns of storage locations, the rack including a lift mechanism for moving materials and articles into and out of the storage locations and delivering them to or retrieving them from individual or grouped trolleys under operator control or automatically.

The invention also includes a trolley for use in an interface trolley system as discussed above, the trolley having a first pair of (front) wheels disposed for rolling over the ground and a second (rear) pair of wheels disposed above the first pair of wheels, for sliding on respective support rails.

In use a method of flexible manufacturing involves disposing individual or plural articles on one or more trolleys in an interface trolley system, extending the trolley system from its retracted position to a work position, carrying out any assembly tasks that are required, and then retracting the trolley or trolleys. A lift disposed in a rack system in the base of which the trolleys are disposed, can be arranged to deliver component articles or materials to the trolley or trolleys and remove assembled or even disassembled components therefrom, retrieving and returning articles and/or materials from storage locations in the rack, as required. Completed assemblies or sub-assemblies can be returned to originating locations or else to specified new storage locations.

BRIEF DESCRIPTION OF THE DRAWINGS

One example of a trolley system constructed in accordance with the present invention, will now be described with reference to the accompanying drawings in which.

BEST MODE FOR CARRYING OUT THE INVENTION

Figure 1:
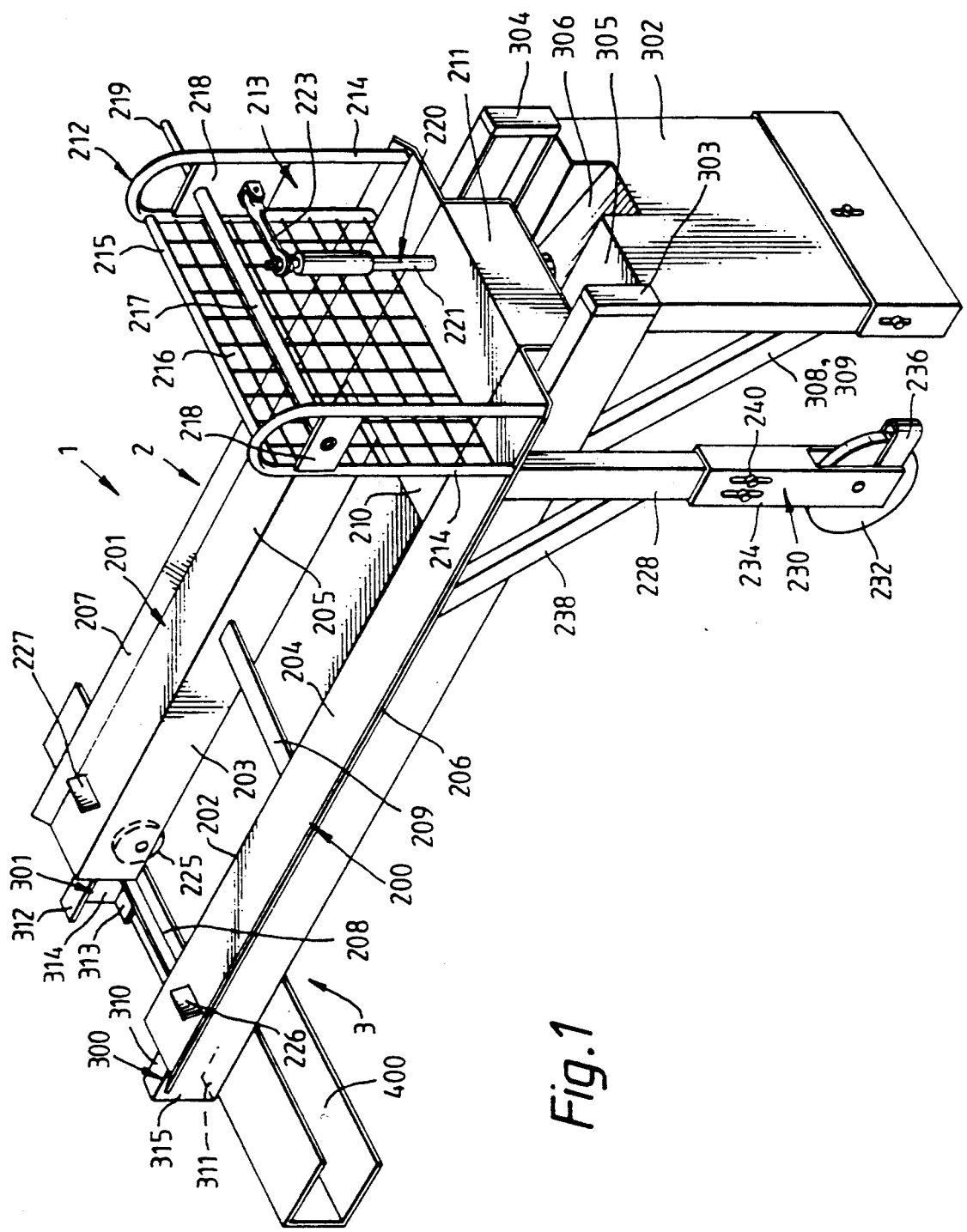
FIG. 1 is a diagrammatic isometric view of an individual trolley assembly.
Figure 2:
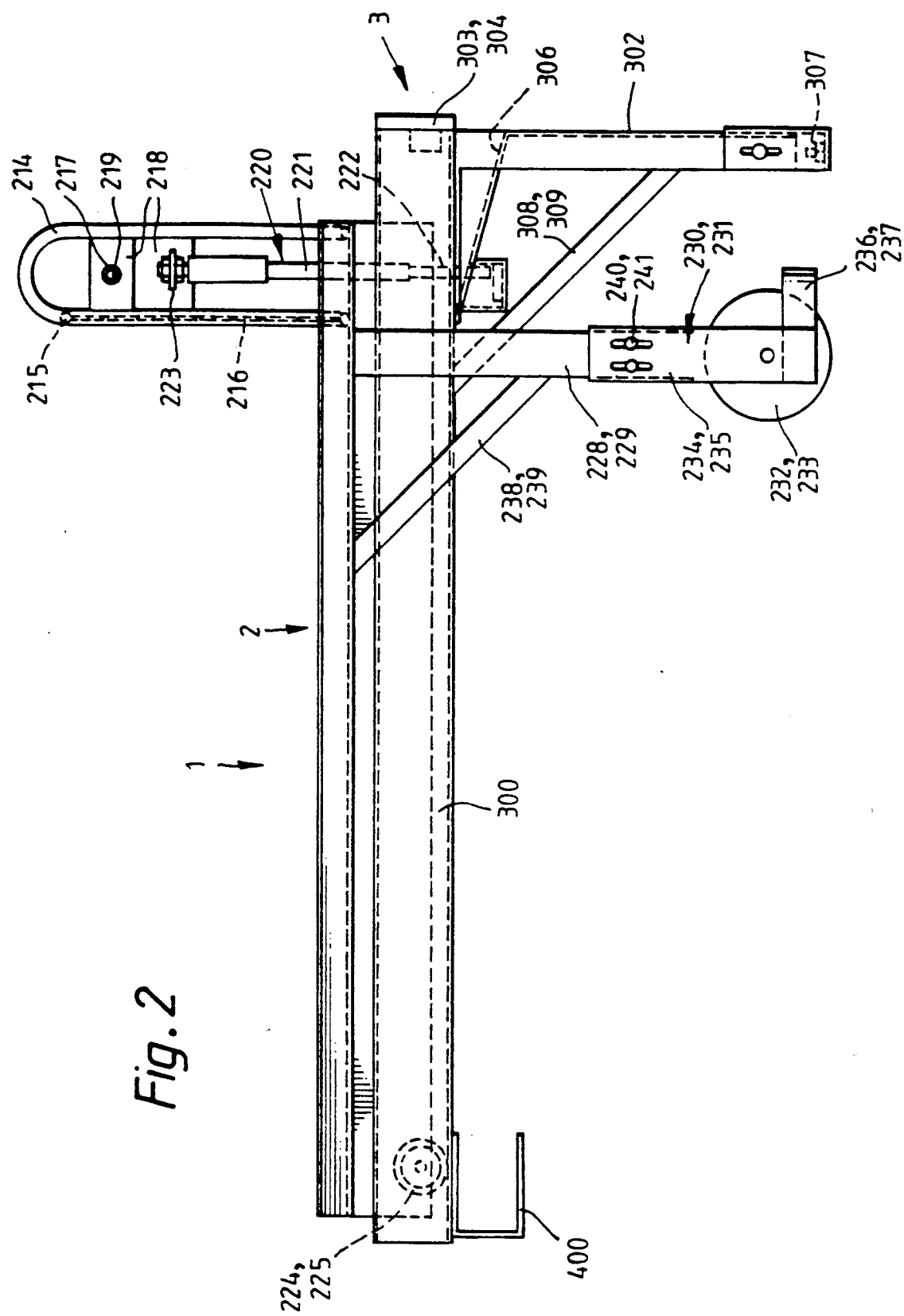
FIG. 2 is a side elevational view of an individual trolley assembly.
Figure 3:
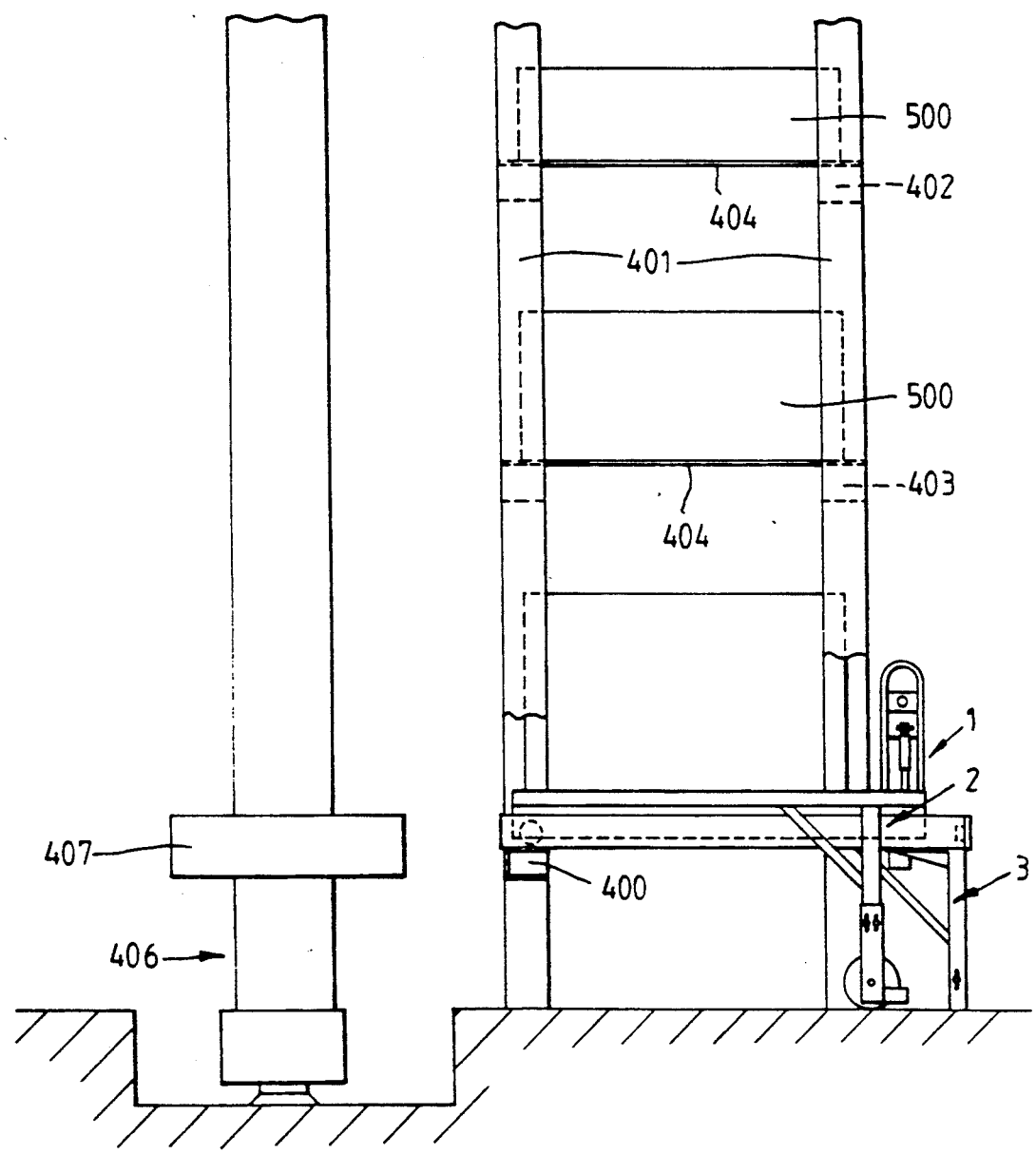
FIGS. 3 and 4 are side elevational views of an interface trolley system incorporated in a rack-type material handling system.
Figure 4:
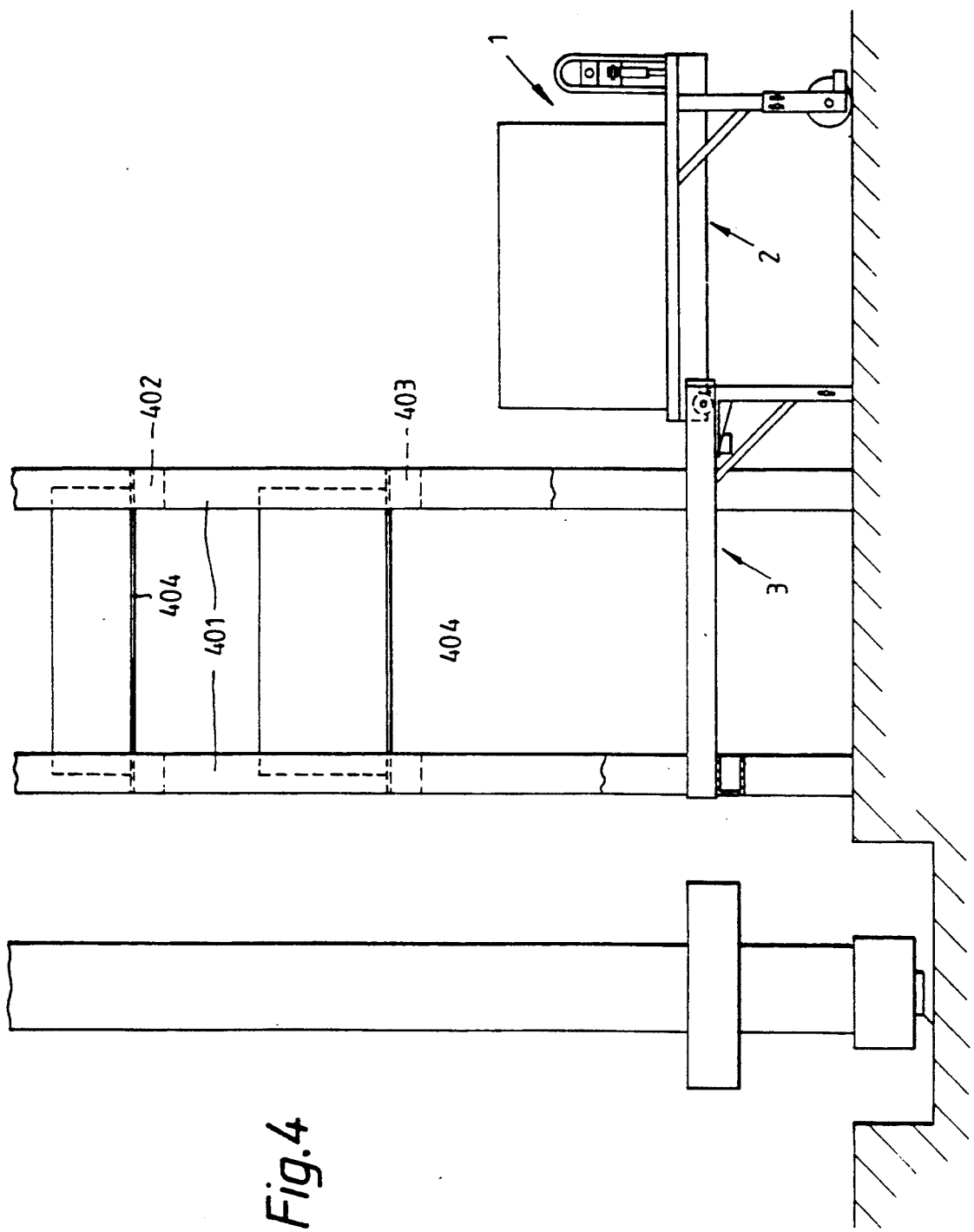
Figure 5:
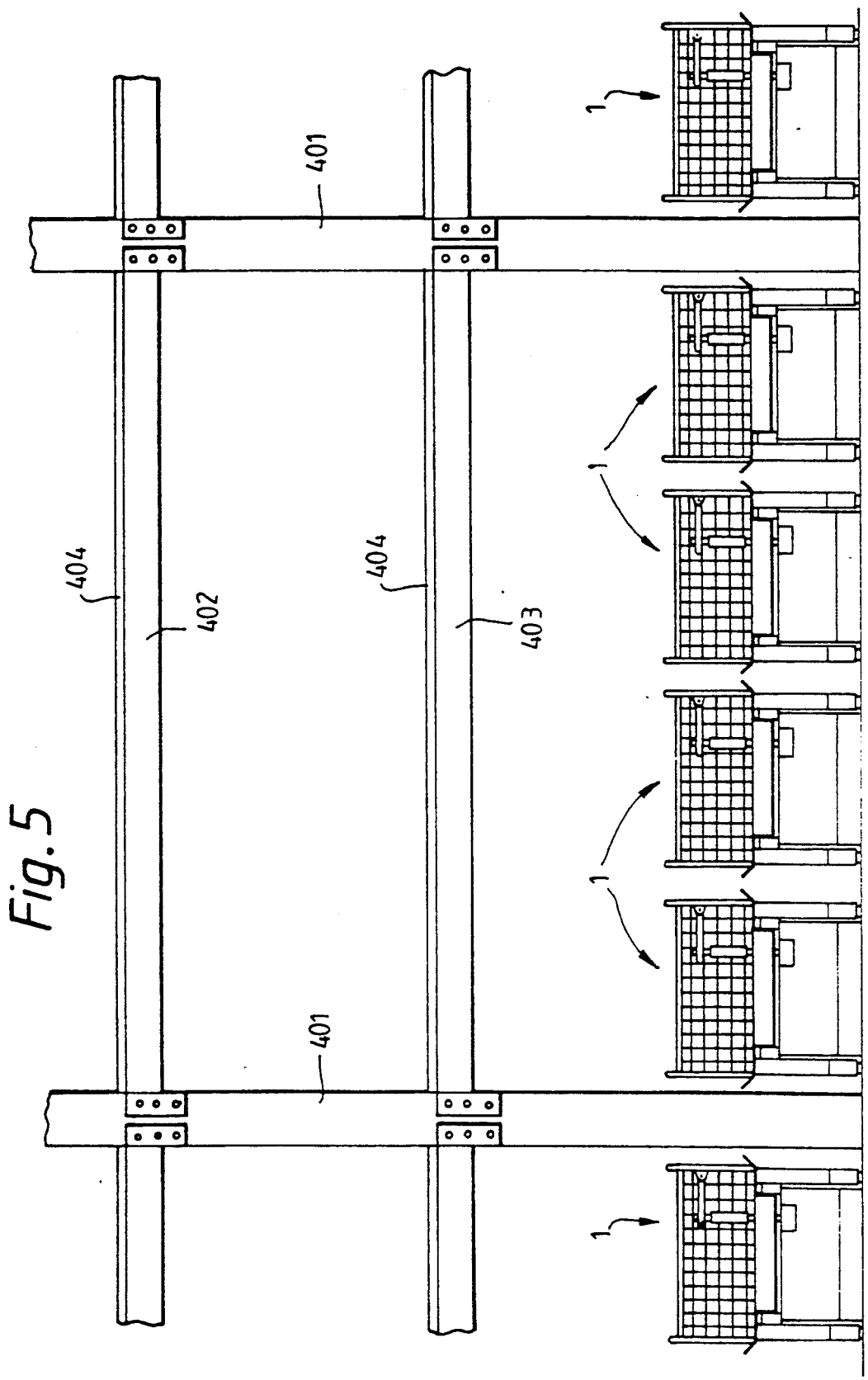
FIG. 5 is a front elevation view of the interface trolley system incorporated in the material handling system.

In FIGS. 1 and 2 a trolley assembly 1 is shown, comprising a movable trolley 2 which is supported on a support frame 3 which in turn is supported, at one end, on a frame member 400 of a rack structure 4 (see FIGS. 3-5).

The support frame 3 comprises a pair of C-sectioned support rails or guides 300,301 disposed horizontally and opposing one another. The support rails 300,301 comprise respective horizontal and vertical flanges 310-315. The support rails 300,301 are spaced above the ground and supported by the frame member 400 at a rearward end and by a pedestal member 302 at a front end. At their front ends the rail members are closed by end plates 303,304. The pedestal 302 carries an upper plate 305 which extends rearwards from the pedestal 302 at the underside of the rails 300,301. The upper plate 305 has a recessed and rearwardly upwardly sloping cam surface 306 in which is formed a hole 306' for a purpose to be described later. The pedestal is bolted to the ground by studs 307 and the support frame 3 is rigidified by inclined side members 308,309 welded or otherwise secured at their respective ends to the support rails 300,301 and to the pedestal 302.

Slidably movable on the support frame 302 is the interface trolley 2 itself. The trolley has a pair of load supporting side members 200,201 each of which has a substantially lazy-Z shaped cross-section formed by respective upright flanges 202,203, horizontally disposed load-supporting flanges 204,205, and upwardly and outwardly inclined load positioning flanges 206,207. The side members 200,201 are spaced apart from one another by cross members 208,209,210,211, the front cross-member 211 of which carries a handle assembly 212 and an interlock mechanism 213. The handle assembly has a pair of inverted U-shaped side members 214 connected by a tubular cross rail 215, a wire mesh grid 216, and a tubular handle 217 supported on side plates 218 mounted on the U-shaped side members 214. Slidable within the handle 217 is a connecting bar 219 (shown in more detail in FIG. 7), which can be moved into a position in which it rests in two adjacent trolley handles, thereby connecting them for movement together. When two or four unit width pallets are disposed on two or four trolleys 2, the respective trolleys are constrained by the pallet to move together, but the simple connection between trolleys, provided by means of the bar 219 slidable in each tubular handle 217 into or out of engagement with the handle 217 of an adjacent trolley 2, enables two adjacent trolleys to carry together a non-palletized wider load.

Figure 7:
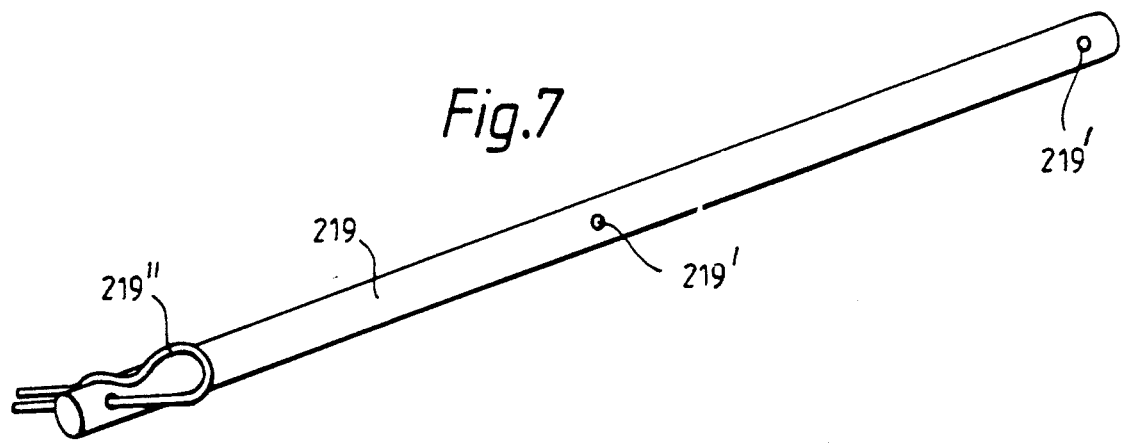

As shown in FIG. 7, the locking bar 219 has three holes 219' extending laterally therethrough, one at each end and one in the middle. Through the holes 219' may extend a hairpin cotter 219", two of which are provided, but only one of which is shown, location of one cotter in each end hole enabling the locking bar 219 to be securely positioned within its respective handle 217 and location of one cotter 219" alone in the middle hole 219', when the bar is pulled partially out of the handle, enabling the bar to be securely positioned in two adjacent handles.

The interlock mechanism 213 has a plunger assembly 220 which consists of an upright tubular member 221 in which is arranged to slide a plunger 222. The plunger 222 is held at its upper end by one end of a cantilevered arm 223 which is in turn pivotally supported, at its other end, on the side plate 219.

The plunger 222 extends through the tubular member 221 and the cross member 211 and is raisable manually by lifting of the arm 223 (as will be described later).

Each of the load supporting side members 200,201 carries a trolley roller 224,225 rotatably mounted on the external face of the respective upright flange 202,203. The trolley rollers 224,225 roll on polyurethane wear strips on the lower flange 310,311 of the support rails 300,301 of the support frame 3. The load-supporting flanges 204,205 have load positioning wedge-like cams 226,227 at their rear ends, for assisting the correct positioning of pallets on the trolleys in use.

Adjacent the front of the trolley 2 a pair of legs 228,229 extend downwardly from the underside of the side members 200,201, each leg having a vertically adjustable wheel assembly 230,231, generally L-shaped and carrying respective trolley wheels 232,233 which roll on the underlying floor surface in use. The wheel assemblies 230,231 have upright box-sectioned portions 234,235 and U-shaped horizontal guard portions 236,237. Inclined side members 238,239 rigidify the legs 228,229 by connection between the legs and the respective side members 200,210. The elevational adjustment of the wheel assemblies 230,231 is achieved by conventional bolt-through-slot assemblies 240,241.

The rack structure 4 (see FIGS. 3-5) comprises a frame having a series of spaced-apart upright support columns 401 with plural transverse racking beams 402,403 (only two levels of which are shown) which support storage decks 404 to define multiple storage locations for materials, components, sub-assemblies and the like. The trolley system, comprising, in this example, groups of four trolley assemblies 1, are located beneath the lower racking beam 402 and are spaced apart at standard spacings such that one, two and four unit width pallets 500 (some of which are shown in FIGS. 3 and 4) can be disposed on one or more of the trolley assemblies 1.

The rack structure 4 also includes a pallet handling lift 406 in the form of a conventional stacker/crane which can move along the length of the rack structure as well as up and down. A carriage assembly 407 includes (not shown) a pair of load engaging forks which can be moved forwardly or rearwardly in order to move palletized loads into and out of storage locations within the rack structure 4 and also on to and off the trolley assemblies 1.

INDUSTRIAL APPLICABILITY

Figure 6:
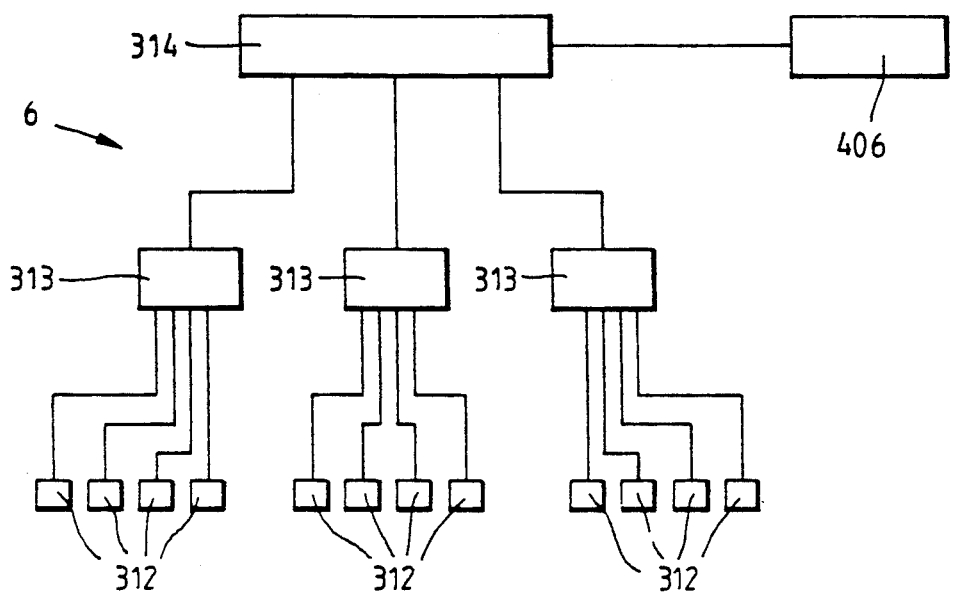
FIG. 6 is a block diagram illustrating an interlock control of the invention; and, FIG. 7 is a view of a locking bar for connecting adjacent trolleys for movement together.

In use, one or more component parts or sub-assemblies can be deposited on the trolley assemblies by the stacker crane and a trolley or trolleys 2 pulled forward into the position shown in FIG. 4 (from the position shown in FIG. 3), in order that further assembly or manufacturing can take place. In order to ensure that the trolleys are not moved forward accidentally and parts are not delivered to the trolley assemblies when the trolleys are in the forward position, the interlock system 212 is utilized in conjunction with the hole 306' in the cam surface 306. The plunger 222 is engaged (under gravity) in the hole 306' in the cam surface 306 in the rearward position and, when in the hole, lies adjacent to a proximity switch 312 (FIG. 6). The individual trolleys cannot be pulled forwards without the arm 223 being lifted to raise the plunger 222 from the hole 306' in the cam surface 306, and when the plunger is raised the proximity switch 312 provides a signal to a respective section 313 of a processor 6 which passes an appropriate signal to a control section 314 of the processor 6 in order to control the movements of the lift 406, in order to prevent any movement of the forks to that respective trolley assembly. It will be appreciated that numerous different arrangements of the interface control may devised as desired.

When a trolley 2 is pushed rearwards, the plunger 222 rides up the cam surface 306 until it drops into the hole 306', latching the trolley in the rearward position.

Materials, components, sub-assemblies or assemblies may additionally be supplied or removed from forwardly extending trolleys by a self-guided vehicle (SGV).

Other aspects, objects and advantages of this invention can be obtained from a study of the drawings, the disclosure, and the appended claims.

I claim:

1. An interface trolley system for a material handling system, comprising:
    a plurality of trolleys having spaced front and rear end portions, said trolleys being disposed tranversely adjacent one another, said trolleys being adapted to carry a load;
    a support frame having a plurality of spaced apart substantially parallel horizontal guides supported on an underlying surface;
    bearing means for movably connecting the rear end portion of each of said trolleys to a respective guide, said trolleys being movable along said respective guide individually and in groups between spaced apart extended and retracted positions, said guides elevationally supporting the rear end portion of said trolleys from said underlying surface;
    means for movably supporting the front of each of said trolleys on said underlying surface; and
    means for latching each trolley to a respective guide and maintaining the trolley at the retracted position and from movement toward the extended position, wherein said latch means comprises a plunger connected to each of said trolleys and disposed in an aperture in a front portion of the guides.

2. An interface trolley system according to claim 1, wherein the trolleys include means for connecting the trolleys to one another to facilitate movement of adjacent trolleys together.

3. An interface trolley system according to claim 2, wherein the means for connecting the trolleys each comprise a locking bar slidably disposed in a tubular member disposed at a front portion of the respective trolley.

4. An interface trolley system according to claim 1, in which the aperture is disposed in a member which also defines a sloping cam surface for elevating the plunger to a position at which the plunger can be extendable into said aperture.

5. An interface trolley system according to claim 1, wherein each trolley includes a pair of front wheel assemblies for supporting a front of the trolley.

6. An interface trolley system according to claim 1, wherein the bearing means includes a pair of rear rollers disposed in guide rails spaced above an underlying surface and supporting a rear of the trolley above the underlying surface.

7. An interface trolley system for a material handling system, comprising:
    a plurality of trolleys disposed adjacent one another;
    a plurality of parallel guides, said trolleys each being slidably connected to a respective guide and movable along said respective guide individually and in groups between spaced apart extended and retracted positions;
    means for connecting the trolleys to one another to facilitate movement of adjacent trolleys together, said connecting means each including a locking bar slidably disposed in a tubular member disposed at a front portion of the respective trolley.

* * * * *